United States Patent [19]

Wandel

[11] 4,269,083
[45] May 26, 1981

[54] CONNECTING ROD

[75] Inventor: David M. Wandel, Farmington Hills, Mich.

[73] Assignee: General Motors Corporation, Detroit, Mich.

[21] Appl. No.: 61,499

[22] Filed: Jul. 27, 1979

[51] Int. Cl.³ .............................. G05G 1/00; F16J 1/14
[52] U.S. Cl. ...................................... 74/579 E; 74/605; 92/157; 92/158; 123/197 AB
[58] Field of Search ................ 74/579 R, 579 E, 581, 74/587, 599, 605, 602; 105/84; 123/41.34, 41.35, 41.37, 41.38, 90.33, 197 AB, 193 P; 184/24; 92/157, 158, 159

[56] References Cited

U.S. PATENT DOCUMENTS

| 1,213,819 | 1/1917 | Bearup | 74/579 E X |
| 2,995,953 | 8/1961 | DeFazi | 74/579 E |
| 3,762,389 | 10/1973 | Malina | 92/157 X |

FOREIGN PATENT DOCUMENTS

| 807091 | 1/1937 | France | 74/579 E |
| 820723 | 11/1937 | France | 74/579 E |

Primary Examiner—C. J. Husar
Assistant Examiner—Moshe I. Cohen
Attorney, Agent, or Firm—C. K. Veenstra

[57] ABSTRACT

A connecting rod assembly for a two-stroke cycle reciprocating piston internal combustion engine has the piston pin axis slightly skewed from the crank-shaft axis to provide favorable conditions for lubricating the piston pin.

5 Claims, 5 Drawing Figures

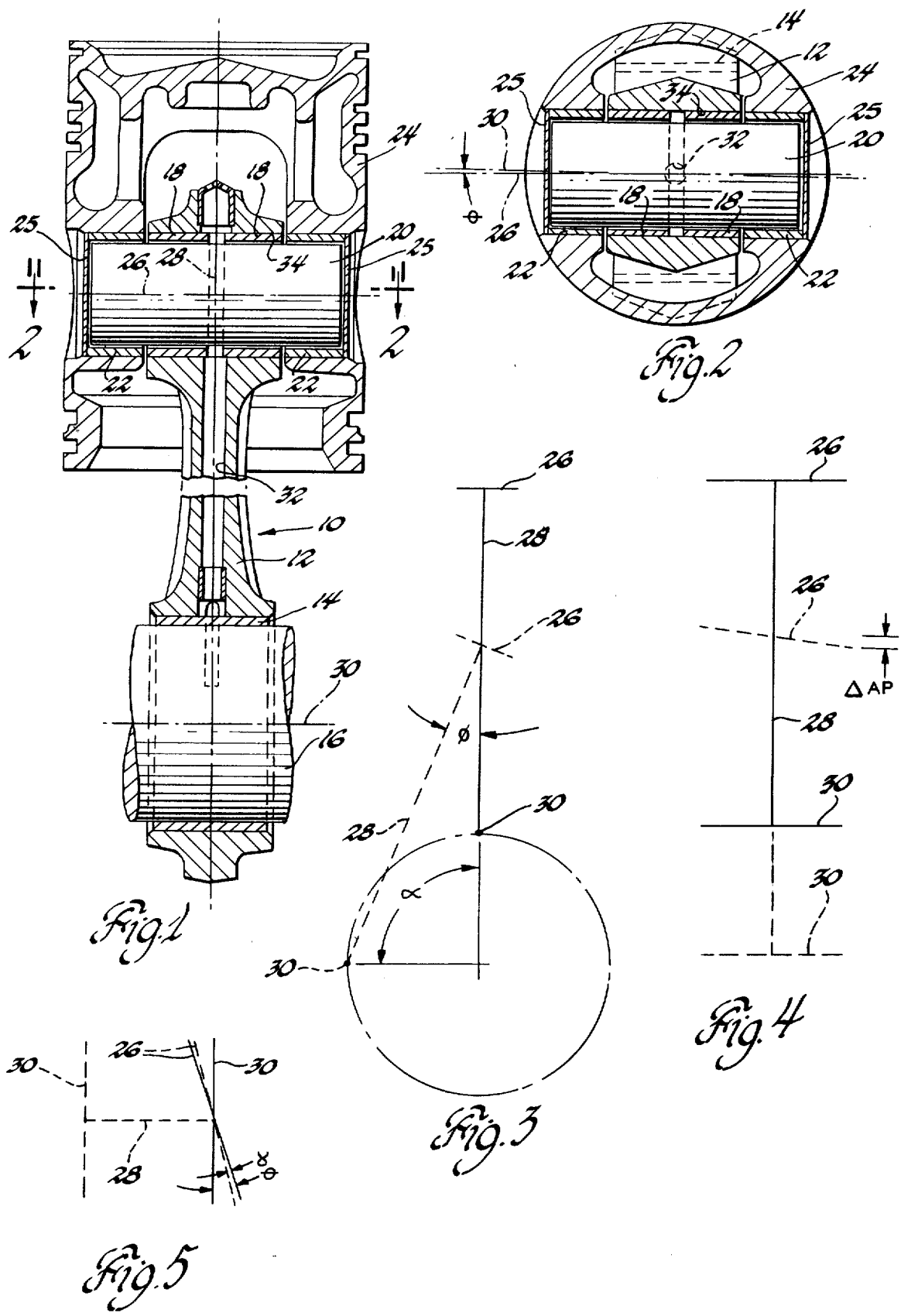

CONNECTING ROD

TECHNICAL FIELD

This invention relates to a connecting rod for use in a piston machine, such as a two-stroke cycle internal combustion engine, having a piston pin which is continuously loaded.

BACKGROUND

In a reciprocating piston internal combustion engine, a connecting rod transmits forces between a piston and a crankshaft. The piston and, in many cases, the connecting rod have bushings which receive a piston pin to secure the piston to the connecting rod. Since the connecting rod rocks with respect to the piston, oil is supplied to lubricate the interengaging surfaces of the pin and the bushings.

Adequate lubrication of these surfaces is more difficult in a two-stroke cycle engine than in a four-stroke cycle engine. In a four-stroke cycle engine, oil flows between the surfaces during the intake stroke when the load of the bushings on the pin reverses. In a two-stroke cycle engine, on the other hand, the bushings are continuously loaded against the pin and oil flow between the surfaces is hindered.

SUMMARY OF THE INVENTION

This invention provides a connecting rod in which the axis of the piston pin is slightly skewed from the crankshaft axis so that it is not parallel to or coplanar with the crankshaft axis. With this structure, the load of the bushings on the pin is shifted to one end during the downstroke of the piston and to the opposite end during the upstroke of the piston. As the load is shifted to one end, a limited lubrication clearance is created between the pin and the bushings at the other end and an oil film flows into that clearance. Thus this invention provides a connecting rod which creates favorable lubrication conditions even though the bushings may be continuously loaded against the pin.

The details as well as other features and advantages of this invention are set forth in the remainder of the specification and are shown in the accompanying drawing.

SUMMARY OF THE DRAWING

FIG. 1 is a sectional elevational view of a piston and a crankshaft provided with a connecting rod made according to this invention.

FIG. 2 is a sectional view along line 2—2 of FIG. 1 showing how the axis of the piston pin is skewed with respect to the axis of the crankshaft.

FIGS. 3, 4 and 5 are schematic views showing the kinematics of a connecting rod made according to this invention.

BEST MODE FOR CARRYING OUT THE INVENTION

Referring to the drawing, a connecting rod assembly 10 has a connecting rod member 12 provided at its lower end with a bearing 14 receiving a crankshaft throw 16. At its upper end, connecting rod member 12 has a pair of bushings 18 receiving a piston pin 20. Outwardly of bushings 18, pin 20 is received by a pair of bushings 22 carried by a piston 24. In this embodiment, pin 20 is a floating pin which is held against axial displacement by a pair of retainers 25; however, this invention also may be embodied in fixed pin arrangements and may be used with other piston designs.

The axis 26 of pin 20 is normal to a line 28 which in turn is normal to the axis 30 of crankshaft throw 16, and it appears from FIG. 1 that pin axis 26 is parallel to crankshaft throw axis 30. As shown in FIG. 2, however, pin axis 26 is skewed at a slight angle $\theta$ from crankshaft throw axis 30. In normal practice, the angle $\theta$ would be minimized so that pin axis 26 would be as close as possible to being parallel to crankshaft throw axis 30; that is, in normal practice the angle $\theta$ would be less than 0.05° as indicated by a runout of less than 0.005 units over a distance of six units.

In a connecting rod according to this invention, however, the angle $\theta$ is established so that pin axis 26 is not substantially parallel to or coplanar with crankshaft throw axis 30. I believe the angle $\theta$ should be between 0.2° and 0.6° and have found that an angle of 0.3°, indicated by a runout of 0.031 units in six units or six times the normal maximum runout, provides substantially reduced wear between pin 20 and bushings 18 and 22. It is believed that skewing of pin 20 relative to crankshaft throw 16 shifts the load of bushings 18 and 22 to one end of pin 20 on the downstroke of piston 24 and to the opposite end of pin 20 on the upstroke of piston 24, creating a limited clearance between pin 20 and bushings 18 and 22 into which an oil film may flow from an oil passage 32. Accordingly, grooves in bushings 18 and 22 appear to be unnecessary for adequate lubrication when this invention is adopted.

The kinematics of a connecting rod made according to this invention are illustrated in FIGS. 3, 4 and 5. As crankshaft throw 16 moves connecting rod 10 and piston 24 from the top dead center position shown in solid lines through an angle $\alpha$ of 90° to the position shown in broken lines, as illustrated in FIG. 3, the apparent parallelism of pin axis 26 to crankshaft throw axis 30 is lost by an amount indicated as $\Delta AP$ in FIG. 4. The following table shows the change in $\Delta AP$ as crankshaft throw 16 moves through an angle $\alpha$ and connecting rod 10 rocks with respect to piston 24 through an angle $\phi$ when $\theta$ is 0.3° (the values in the table have been computed from a connecting rod assembly having particular dimensions not important to an understanding of this invention, it being sufficient to note the initial increase and subsequent decrease in $\Delta AP$):

| ALPHA | DELTA AP | GAMMA | PHI |
|---|---|---|---|
| 0 | 0.00000 | 0.00000 | 0.00 |
| 10 | 0.00046 | 0.00030 | 2.54 |
| 20 | 0.00092 | 0.00115 | 5.02 |
| 30 | 0.00134 | 0.00246 | 7.34 |
| 40 | 0.00172 | 0.00408 | 9.46 |
| 50 | 0.00205 | 0.00581 | 11.30 |
| 60 | 0.00232 | 0.00745 | 12.79 |
| 70 | 0.00252 | 0.00879 | 13.90 |
| 80 | 0.00264 | 0.00967 | 14.58 |
| 90 | 0.00268 | 0.00997 | 14.81 |
| 100 | 0.00264 | 0.00967 | 14.58 |
| 110 | 0.00252 | 0.00879 | 13.90 |
| 120 | 0.00232 | 0.00745 | 12.79 |
| 130 | 0.00205 | 0.00581 | 11.30 |
| 140 | 0.00172 | 0.00408 | 9.46 |
| 150 | 0.00134 | 0.00246 | 7.34 |
| 160 | 0.00092 | 0.00115 | 5.02 |
| 170 | 0.00046 | 0.00030 | 2.54 |
| 180 | 0.00000 | 0.00000 | 0.00 |

The table also shows the variation $\gamma$ in the skew-angle $\theta$ between pin axis 26 and crankshaft throw axis 30 which appears to occur—when view from the top as illustrated in FIG. 5. It will be appreciated that $\Delta AP$, $\gamma$ and $\phi$ vary symmetrically in the opposite direction as $\alpha$ is increased from 180° to 360°.

The great exaggeration of the skew-angle $\theta$ and of the loss of apparent parallelism $\Delta AP$ as set forth in the drawings clearly shows that the load of bushings 18 and 22 on pin 20 does shift to the left end of its axis 26 (as viewed in FIG. 4) during the first 90° of travel of crankshaft throw 16 from the top dead center position. The entire pin again receives the load as the bottom dead center position is approached, then the load is shifted to the right end of axis 26, and the entire pin again receives the load as the top dead center position is again approached.

As the left end of pin 20 assumes the load, a limited lubrication clearance is created above the right end of pin 20, allowing an oil film to flow between pin 20 and the right side bushings 18 and 22. Similarly, as the right end of pin 20 assumes the load, a limited lubrication clearance is created above the left end of pin 20, allowing lubrication of the left side bushings 18 and 22. Thus this invention provides a connecting rod which creates favorable lubrication conditions even though pin 20 remains continuously loaded.

Shifting of the load to one end of pin 20 does not overload the bushings 18 and 22 at that end because the load on pin 20 is being reduced as it is shifting. For example, the load borne by the bushings 18 and 22 at one end of pin 20 when $\alpha$ equals 90° is only 25% of the load borne by all four bushings 18 and 22 when $\alpha$ equals 0° at top dead center. Tests indicate that the improved lubrication conditions created by this invention offset any increase in wear that might be induced by shifting the load and actually reduce the wear experienced by the pin and bushings.

It will be appreciated that there are a variety of ways to manufacture a connecting rod according to this invention. Preferably, bushings 18 are inserted in rod member 12 and then machined at the desired skew angle. Among the alternatives, however, it is noted that the bore 34 for rod bushings 18 could be established at the desired skew angle before insertion of bushings 18 or rod member 12 could be deformed to the desired skew angle.

The embodiments of the invention in which an exclusive property or privilege is claimed are defined as follows:

1. A connecting rod particularly adapted for use in a continuously loaded piston machine, said rod having a crankshaft receiving bearing and a piston pin receiving bushing formed about axes normal to a line intersecting said axes, and wherein said piston pin bushing axis is not substantially parallel to said crankshaft bearing axis whereby the load transmitted through said piston pin bushing shifts along its axis to provide favorable piston pin bushing lubrication conditions during operation of said connecting rod in said machine.

2. A connecting rod particularly adapted for use in a continuously loaded piston machine, said rod having a crankshaft receiving bearing and a piston pin receiving bushing formed about axes normal to a line intersecting said axes, and wherein said piston pin bushing axis is skewed at an angle of from about 0.2° to about 0.6° with respect to said crankshaft bearing axis whereby the load transmitted by said piston pin bushing shifts along its axis to provide favorable piston pin bushing lubrication conditions during operation of said connecting rod in said machine.

3. A connecting rod particularly adapted for use in a continuously loaded piston machine, said rod having a crankshaft receiving bearing and a piston pin receiving bushing formed about axes normal to a line intersecting said axes, and wherein said piston pin bushing axis is skewed at an angle of about 0.3° with respect to said crankshaft bearing axis whereby the load transmitted by said piston pin bushing shifts along its axis to privide favorable piston pin bushing lubrication conditions during operation of said connecting rod in said machine.

4. A connecting rod particularly adapted for use in a continuously loaded piston machine, said rod having a crankshaft receiving bearing and a piston pin receiving bushing, and wherein the axis of said piston pin bushing is not substantially coplanar with the axis of said crankshaft bearing whereby the load transmitted by said piston pin bushing shifts along its axis to provide favorable piston pin bushing lubrication conditions during operation of said connecting rod in said machine.

5. A connecting rod assembly for a two-stroke cycle internal combustion engine having a crankshaft and a piton provided with a pair of co-axially spaced piston pin bushings, said assembly comprising a connecting rod member having a crankshaft bearing adapted to receive said crankshaft and further having a pair of co-axially spaced piston pin bushings, and a piston pin received by said bushings of said connecting rod assembly and adapted for reception by said bushings of said piston, wherein both the axis of said crankshaft bearing and the axis of said piston pin are normal to a line intersecting said axes, and wherein the axis of said piston pin is not substantially parallel to the axis of said crankshaft bearing whereby limited lubrication clearance is alternately provided at opposite ends of said piston pin between said piston pin and said bushings during operation of said connecting rod assembly in said in said engine.

* * * * *